(12) United States Patent
Jang et al.

(10) Patent No.: US 9,204,289 B2
(45) Date of Patent: Dec. 1, 2015

(54) METHOD AND APPARATUS OF HANDLING USER EQUIPMENT CATEGORY IN WIRELESS COMMUNICATION SYSTEM

(75) Inventors: Jae Hyuk Jang, Suwon-si (KR); Soeng Hun Kim, Yongin-si (KR); Gert-Jan Van Lieshout, Staines (GB); Joon Young Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/371,901

(22) Filed: Feb. 13, 2012

(65) Prior Publication Data

US 2012/0207130 A1 Aug. 16, 2012

Related U.S. Application Data

(60) Provisional application No. 61/442,985, filed on Feb. 15, 2011, provisional application No. 61/481,878, filed on May 3, 2011, provisional application No. 61/484,645, filed on May 10, 2011.

(30) Foreign Application Priority Data

Dec. 26, 2011 (KR) .................. 10-2011-0141878

(51) Int. Cl.
*H04W 4/00* (2009.01)
*H04W 8/24* (2009.01)
*H04W 76/04* (2009.01)

(52) U.S. Cl.
CPC .............. *H04W 8/24* (2013.01); *H04W 76/046* (2013.01)

(58) Field of Classification Search
CPC .. H04L 1/1835; H04L 1/1845; H04B 7/0413; H04W 72/0406; H04W 72/048; H04W 88/06; H04W 88/10; H04W 72/04
See application file for complete search history.

(56) References Cited

U.S. PATENT DOCUMENTS 8,228,872 B2 7/2012 Jung et al.
2006/0179387 A1* 8/2006 Taffin et al. .............. 714/746
(Continued)

FOREIGN PATENT DOCUMENTS

CN 101965707 A 2/2011
EP 1 213 941 A2 6/2002
(Continued)

OTHER PUBLICATIONS

Huawei, "Clarification on the Report of E-DCH Physical Layer Category Extension", 3GPP TSG RAN WG2 meeting #68bis, R2-100127, Jan. 18-22, 2010.
(Continued)

*Primary Examiner* — David Oveissi
(74) *Attorney, Agent, or Firm* — Jefferson IP Law, LLP

(57) ABSTRACT

A User Equipment (UE) category handling method and an apparatus for handling late version UE category attached to an early release version network in a Long Term Evolution (LTE) system are provided. A communication method includes transmitting a terminal capability report message including multiple terminal categories, receiving a Radio Resource Control (RRC) connection reconfiguration message including a terminal category to be used by the terminal according to serving base station of the terminal, and communicating with the network using the terminal category received from the network. The UE category handling method and apparatus of the present invention allows the UE to report a network-adaptive UE category, thereby avoiding soft buffer problem caused by version information mismatch and facilitating communication with the network without malfunctioning.

14 Claims, 4 Drawing Sheets

(56) References Cited

U.S. PATENT DOCUMENTS

| | | |
|---|---|---|
| 2007/0224990 A1* | 9/2007 | Edge et al. .................... 455/436 |
| 2009/0093280 A1 | 4/2009 | Kitazoe |
| 2010/0050034 A1* | 2/2010 | Che et al. ...................... 714/748 |
| 2010/0135208 A1 | 6/2010 | Ishii et al. |
| 2011/0035639 A1* | 2/2011 | Earnshaw et al. ............. 714/748 |
| 2011/0086656 A1* | 4/2011 | Zhou .............................. 455/507 |
| 2012/0002614 A1* | 1/2012 | Ekici et al. .................... 370/329 |
| 2012/0087396 A1* | 4/2012 | Nimbalker et al. ........... 375/219 |

FOREIGN PATENT DOCUMENTS

| | | |
|---|---|---|
| EP | 2 031 921 A1 | 3/2009 |
| EP | 2 200 356 A2 | 6/2010 |
| EP | 2 265 077 A1 | 12/2010 |
| KR | 10-2009-0122174 A | 11/2009 |
| KR | 10-2010-0088509 A | 8/2010 |
| WO | 2010/019087 A1 | 2/2010 |

OTHER PUBLICATIONS

Research in Motion UK Limited, "Clarification of Rel-10 UE category and MIMO Layer Capability Definition", 3GPP TSG RAN WG1 meeting #63bis, R1-110283, Jan. 17-21, 2011.

LG Electronics, Remaining Details on Transmission Mode 9, 3GPP TSG RAN WGI Meeting #63, R1-106322, Nov. 10, 2010, Sophia Antipolis, France.

* cited by examiner

METHOD AND APPARATUS OF HANDLING USER EQUIPMENT CATEGORY IN WIRELESS COMMUNICATION SYSTEM

CROSS-REFERENCE TO RELATED APPLICATIONS

This application claims the benefit under 35 U.S.C. §119 (e) of a U.S. Provisional application filed on Feb. 15, 2011 in the U.S. Patent and Trademark Office and assigned Ser. No. 61/442,985, a U.S. Provisional application filed on May 3, 2011 in the U.S. Patent and Trademark Office and assigned Ser. No. 61/481,878, and a U.S. Provisional application filed on May 10, 2011 in the U.S. Patent and Trademark Office and assigned Ser. No. 61/484,645, and under 35 U.S.C. §119(a) of a Korean patent application filed on Dec. 26, 2011 in the Korean Intellectual Property Office and assigned Serial No. 10-2011-0141878, the entire disclosure of each of which is hereby incorporated by reference.

BACKGROUND OF THE INVENTION

1. Field of the Invention

The present invention relates to a wireless communication system. More particularly, the present invention relates to a method and apparatus for handling late version User Equipment (UE) category at an early release version network in a Long Term Evolution (LTE) system.

2. Description of the Related Art

Mobile communication systems developed to provide subscribers with voice communication services on the move. With the rapid advance of technologies, the mobile communication systems have evolved to support high speed data communication services as well as standard voice communication services. However, the resource shortage and user requirements for higher speed service in the current mobile communication system spurs the evolution to more advanced mobile communication system.

Recently, the next generation mobile communication system of the 3rd Generation Partnership Project (3GPP), Long Term Evolution (LTE) and LTE-Advanced (LTE-A) are being standardized. In order to fulfill the requirements of the next generation system standards, several schemes are under discussion such as one for reducing the number of nodes located in a communication path by simplifying a configuration of the network and another for maximally approximating radio protocols to radio channels.

Meanwhile, with the development of radio communication technologies, the mobile communication system evolves from an old version to a new version by adding newly introduced functions, resulting in a capability problem between the old and new networks.

For example, LTE has evolved from the initial version of Release-8 (Rel-8) to current version of Rel-10 with the intermediate version of Rel-9. However, such a communication environment where multiple networks running different versions of LTE standards coexist causes a problem in that the Rel-8/9 network does not understand 'UE category' signaled by a Rel-10 UE.

There is therefore a need of a method for resolving the compatibility problem between a UE and a network running different LTE versions.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a method and apparatus for handling a User Equipment (UE) category that is capable of facilitating communication between the UE and a network by reporting the UE category in match with the network release version in a network attach process of a late release UE.

In order to address the above problem, the UE notifies of the first UE category and the second UE category in a network attach process, and the eNB determines the UE category to be used and notifies the UE of the determined UE category. The UE configures the UE category and total number of soft channel bits as informed by the network. Before receiving the information from the network, the UE avoids malfunctioning by using a category in the first UE category group and a corresponding total number of soft channels. In a handover process, if a handover command message including no category-related information is received, the UE uses a category in the first UE category group and, otherwise if the handover command message includes category-related information, communicates with the target eNB using the received category information.

In accordance with an aspect of the present invention, a communication method of a terminal in a mobile communication system is provided. The communication method includes transmitting a terminal capability report message including multiple terminal categories, receiving a Radio Resource Control (RRC) connection reconfiguration message including a terminal category to be used by the terminal according to a serving base station of the terminal, and communicating with the network using the terminal category received from the network.

In accordance with another aspect of the present invention, a terminal for communicating with a network in a mobile communication system is provided. The terminal includes a transceiver for communicating signals with the network, and a controller for controlling transmission of a terminal capability report message including multiple terminal categories, receiving an RRC connection reconfiguration message including a terminal category to be used by the terminal according to a serving base station of the terminal, and communicating with the network using the terminal category received from the network.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

Figure 1:
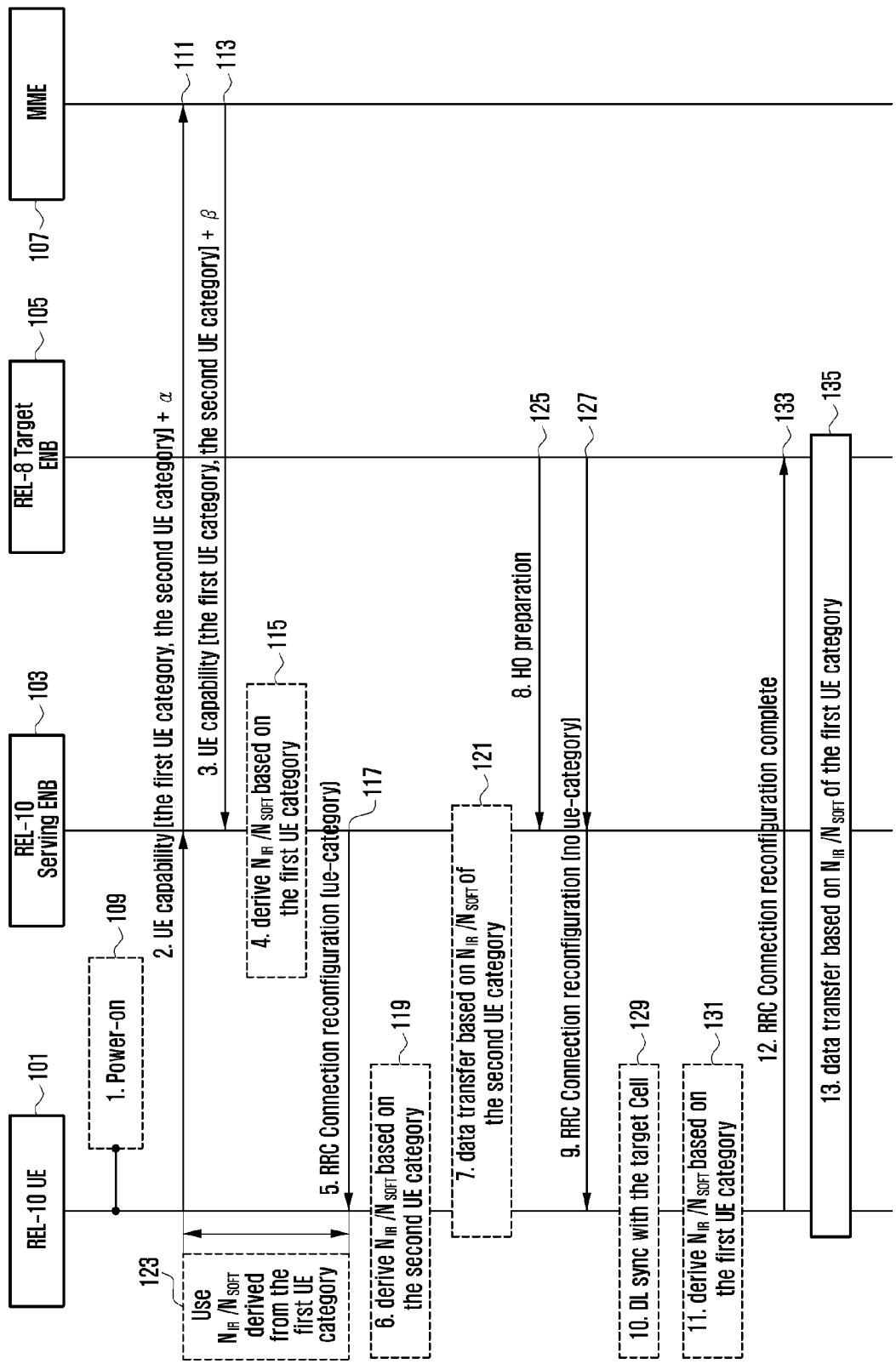
FIG. 1 is a signaling diagram illustrating message flows in a User Equipment UE category handling method according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Although the description is directed to the Advanced Evolved-Universal Terrestrial Radio Access (E-UTRA) (or Long Term Evolution-Advanced (LTE-A)) system supporting carrier aggregation, it will be understood by those skilled in the art that the subject matter of the present invention can be applied to other mobile communication systems having the similar technical background and channel format, with a slight modification, without departing from the spirit and scope of the invention.

In the legacy LTE system, the User Equipment (UE) reports its radio communication capability in "UE category" transmitted to the network such that the network provides the UE with the service in accordance with the UE category. Table 1 shows the information on the UE categories.

TABLE 1

| UE Category | Maximum number of bits receivable within a TTI (1 ms) | Maximum number of bits of transport block within a TTI | Total number of soft channel bits (buffer size) | Maximum number of layers supportable in DL |
|---|---|---|---|---|
| Category 1 | 10296 | 10296 | 250368 | 1 |
| Category 2 | 51024 | 51024 | 1237248 | 2 |
| Category 3 | 102048 | 75376 | 1237248 | 2 |
| Category 4 | 150752 | 75376 | 1827072 | 2 |
| Category 5 | 299552 | 149776 | 3667200 | 4 |
| Category 6 | 301504 | 75376 | 3667200 | 2 |
| Category 6' | 301504 | 149776 (4 layers) | 3667200 | 4 |
| Category 7 | 301504 | 75376 (2 layers) | 3667200 | 2 |
| Category 7' | 301504 | 149776 (4 layers) | 3667200 | 4 |
| Category 8 | 2998560 | 299856 (2 layers) | 35982720 | 8 |

In Table 1, it is possible to obtain the maximum data rate by multiplying the 'maximum number of bits receivable within a Transmission Time Interval (TTI) (1 ms)' by 1000.

The 'total number of soft channel bits' relates to the buffer size of the UE and affects the rate matching operation. If the 'total number of soft channel bits' is $N_{soft}$, 'transport block soft buffer size' is $N_{IR}$, and 'code block soft buffer size' is $N_{cb}$, the following relationship is obtained:

$$N_{IR} = \left\lfloor \frac{N_{soft}}{K_{MIMO} \cdot \min(M_{DL\_HARQ}, M_{limit})} \right\rfloor,$$

$$N_{cb} = \min\left(\left\lfloor \frac{N_{IR}}{C} \right\rfloor, K_w\right)$$

where $K_{MIMO}$ has a value of 2 or 1 depending on the transmission mode, and min $(M_{DL\_HARQ}, M_{limit})$ has a value of 8 in general. C denotes a number of code blocks, and $K_W$ denotes the length of a circular buffer with relationship of $K_W = 3Kn$ (Kn is a sub-block interleaver size of 6144 bits). As shown in the equation, if $N_{soft}$ affects $N_{IR}$ and if $N_{IR}/C$ is less than $K_W$, i.e. if high speed data transmission is in progress, $N_{IR}$ affects $N_{cb}$. Since the value of $N_{cb}$ affects the puncturing/repetition pattern, the $N_{soft}$ mismatch between the UE and eNB causes malfunction.

In Table 1, the 'maximum number of layers supportable in downlink' means the UE capability in Multi-Input Multi-Output (MIMO) technique with multiple transmit/receive antennas.

Although categories 6 and 7 have the same downlink maximum data rate in Table 1, they have different uplink maximum data rates of 75 Mbps and 150 Mbps. The category 6 is subcategorized into 6 and 6', and the category 7 is subcategorized into 7 and 7'. The categories 6 and 7 indicate carrier aggregation while categories 6' and 7' indicate that 4 layers are supported in MIMO.

Meanwhile, the Rel-8/9 system (hereinafter, the term "first version network" is used interchangeably) supports UE categories 1 to 5, while categories 6 to 8 are introduced for use in Rel-10 system (hereinafter, the term "second version network" is used interchangeably). Accordingly, the Rel-8/9 network cannot interpret the UE categories 6 to 8. In the legacy LTE system, the UE is not aware of the release of the current network (i.e. network version information) and thus it is necessary for the Rel-10 UE to signal additional information to help the Rel-8/9 network identify a UE category of the Rel-10 UE but not UE categories 6 to 8. If defining the categories 1 to 5 as a first UE category group and the categories 6 to 8 as a second UE category group, it is not clear for the UE to use which category group for communication with the network.

In order to address this problem, exemplary embodiments of the present invention provide a method for facilitating communication between a UE and a network in such a way that, when attempting attach to the network, the late release UE informs of the UE category in accordance with the release version of the network.

FIGS. 1 through 4, discussed below, and the various exemplary embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the invention. Terms first, second, and the like are used to differentiate between objects having the same terminology and are in no way intended to represent a chronological order, unless where explicitly stated otherwise. A set is defined as a non-empty set including at least one element.

FIG. 1 is a signaling diagram illustrating message flows in a UE category handling method according to an exemplary embodiment of the present invention.

Referring to FIG. 1, among Rel-10 or later version UEs, the UE 101 whose category is not understood by the Rel-9 or earlier version network powers on in step 109. The UE 101 sends the networks including a serving evolved Node-B (eNB) 103 and a Mobility Management Entity (MME) 107 a plurality of categories in a predetermined control message in step 111. The control message can be a UE capability message including information on the radio communication capability of the UE.

As aforementioned, the UE category can be selected from the first UE category group (categories 1 to 5) and the second UE category group (categories 6 to 8). According to an exemplary embodiment of the present invention, the UE sends the first UE category in a 'ue-Category' field of the UE capability message and the second UE category in a 'ue-Category-v10xy' field (xy can be changed for version information) of the UE capability message. The UE capability report message further includes UE capability-related information such as layer 2 buffer size of the UE and supportable frequency band.

For reference, the UE 101 can report multiple UE categories but can only report one category among the categories of 1 to 5 and one category among the categories of 6 to 8. That is, if the UE 101 transmits multiple UE categories, this means that the multiple categories are transmitted for use in respective release version networks but not for use in the same release version network.

In case of an early release version UE, the UE 101 sends the network a UE capability report message including a first UE category.

The control message, i.e. UE capability report message, is delivered to the MME 107 (responsible for managing UE mobility in the network) via the serving eNB 103. Here, the serving eNB 103 forwards the UE capability report to the MME 107 without checking UE capability.

Upon receipt of the UE capability report message, the MME 107 sends the serving eNB 103 the UE information including a UE category extracted from the UE capability information in step 113. Here, the MME 107 knows the technology version of the UE 103 and the serving eNB already. Accordingly, the MME 107 provides the serving eNB 103 with the UE category for compatibility between the UE 101 and a target eNB 105 by taking notice of the versions of the UE 101 and eNB 103. Since the Rel-10 or later UE 101 attaches to the Rel-10 or later serving eNB 103 in the exemplary case of FIG. 1, the MME sends the serving eNB 103 the UE capability response message including the first UE category and second UE category at step 113.

If the serving eNB 103 is a Rel-8/9 eNB, the MME 107 sends the serving eNB 103 the UE capability response message including only the first category information.

Afterward, the serving eNB 103 selects the category to be used for the UE 101.

If the serving eNB 103 is a Rel-8/9 eNB, the serving eNB 103 ignores the second UE category and does not inform of the UE category to be used for the UE 101 explicitly.

In contrast, if it is determined that the serving eNB 103 is a Rel-10 or later eNB, it can understand the second UE category. Accordingly, the serving eNB 103 determines to use the second UE category and sends a Radio Resource Control (RRC) Connection Reconfiguration message including the UE category information having Nsoft to be used to the UE 101 in order to use Nsoft of the second UE category in step 117.

The second UE category use can be indicated in such a way of designating the category to be used by the UE directly or configuring a new function introduced in Rel-10 system. The newly introduced function of Rel-10 system can be checked upon one of the following events:

when transmission mode 9 is configured as downlink transmission mode;

when each UE has a transmission mode for Physical Downlink Shared Channel (PDSCH) transmission, mode 8 is newly defined in Rel-9 and mode 9 is newly defined in Rel-10;

when transmission mode 9 supports Single User-Multi-Input Multi-Output (SU-MIMO);

when transmission mode 9 supports multi-layer transmission and uses Rel-10 Demodulation Reference Signal (DMRS) in demodulation so as to be able to transmit up to 8 layers. Although the Rel-10 DMRS is transmitted as precoded, it is not necessary to notify the receiver of precoder index;

when, in order to support the transmission mode 9, Downlink Control Information (DCI) format 2C is newly defined in Rel-10;

when transmission mode 2 is configured as uplink transmission mode;

when carrier aggregation is configured; and when MIMO capability higher than UE's Rel-8 MIMO capability is configured.

If the "second UE category' is designated directly or a predetermined function (e.g. transmission mode 9) is configured, the UE 101 derives $N_{soft}$ and $N_{IR}$ using the designated 'second UE category' in step 119. Next, the UE 101 communicates data with the network based on the derived values $N_{soft}$ and $N_{IR}$ in step 121.

According to an exemplary embodiment of the present invention, the UE 101 which has not received the RRC connection reconfiguration message (i.e. has not configured the transmission mode 9) derives $N_{soft}$ and $N_{IR}$ using the first UE category or the lowest one of the UE categories it has reported to transmit/receive data at steps 115 and 123. Afterward, if it is determined to perform handover at a certain time point, the serving eNB 103 performs handover procedure with the target eNB 105 in step 125.

The target eNB 105 sends the serving eNB 103 the configuration information to be applied after the UE 101 has completed the handover to the target eNB 105 at step 125. Next, the serving eNB 103 sends an RRC Connection Reconfiguration message with mobility control information in step 127.

If the target eNB 105 is a legacy eNB (Rel-8/9 eNB), the UE category information (or $N_{soft}$) is not included in the configuration information. Otherwise, if the target eNB 105 is an advanced eNB (Rel-10 eNB) and if the second UE category is to be applied, the UE category information to be used is included in the configuration or newly added Rel-10 function is configured. The newly introduced function can be checked upon one of the following events:

when transmission mode 9 is configured as downlink transmission mode;

when transmission mode 2 is configured as uplink transmission mode;

when carrier aggregation is configured;

when MIMI capability higher than Rel-8 category MIMO capability of UE; and upon receipt of the handover command message, the UE 101 establishes downlink synchronization with the target eNB 105 in step 129;

If the handover command message received at step 127 includes the UE category to be used (or $N_{soft}$ information) and is configured with a new Rel-10 function, the UE 101 determines $N_{IR}$ using $N_{soft}$ for the second UE category that corresponds to the indicated UE category information or has been reported previously.

If the handover command message transmitted at step 127 includes no UE category information or has been configured without any Rel-10 related function, the UE 101 determines $N_{IR}$ using $N_{soft}$ of the first UE category (or earliest UE category of among the UE categories reported or a UE category between categories 1 to 5) in step 131.

Next, the UE 101 sends the target eNB 105 a handover complete message in step 133 and performs data communication using $N_{soft}$ and $N_{IR}$ determined at step 131 in step 135.

Figure 2:
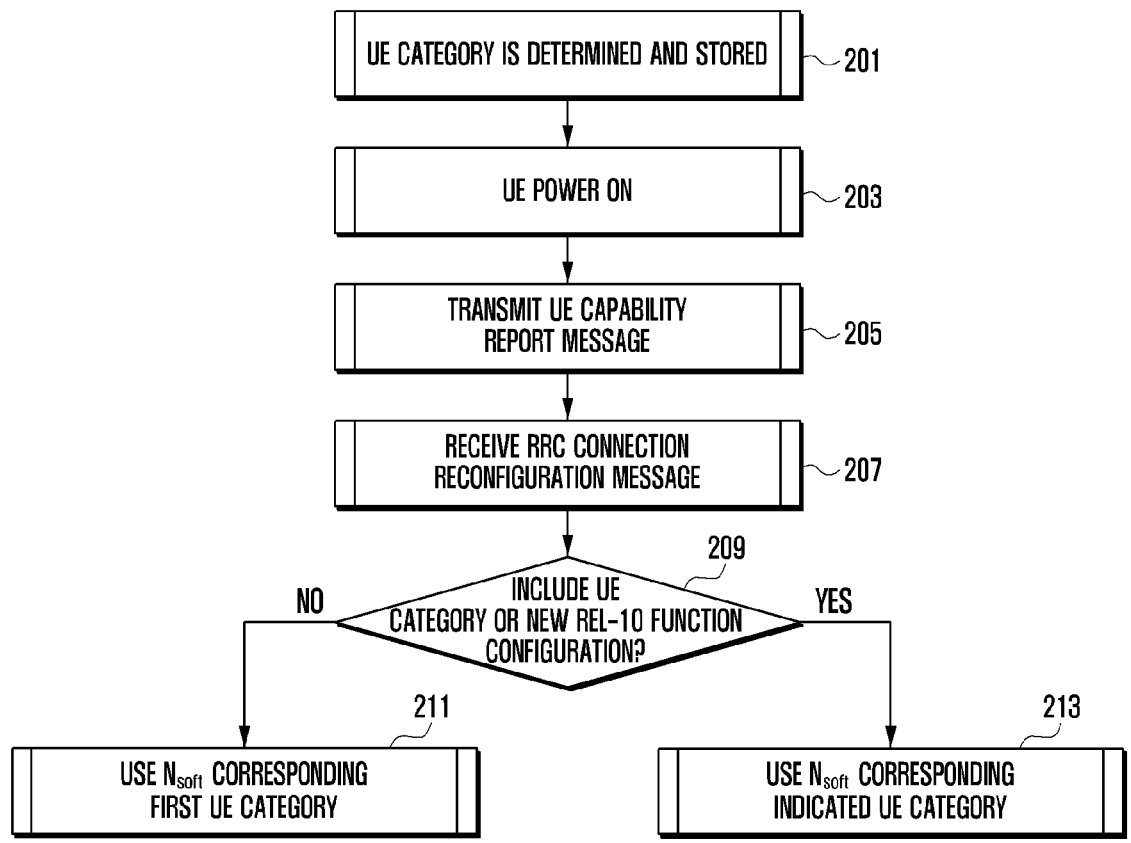
FIG. 2 is a flowchart illustrating a UE procedure of a UE category handling method according to an exemplary embodiment of the present invention.

FIG. 2 is a flowchart illustrating a UE procedure of a UE category handling method according to an exemplary embodiment of the present invention. FIG. 2 is directed to the operations of Rel-10 UE.

Referring to FIG. 2, a UE category is determined at the manufacturing stage and stored in the internal memory of the UE in step 201. The UE having one of the categories 6 to 8 in the second UE category group can be assigned one more category that can be recognized by a legacy eNB for preparing the case attaching to the legacy eNB.

Afterward, if the UE powers on at step 203, it selects the best cell to camp on and performs a network attach process with the selected cell. At this time, the UE performs downlink data communication under the assumption that the network is of ($N_{soft}$ of) the first UE category group. That is, the first UE performs a Hybrid Automatic Repeat Request (HARM) process using $N_{soft}$ of the first UE category group.

After being attached to the network, the UE transmits a UE capability report message including information on the UE's radio communication capability to the MME in step 205. The UE capability report message includes a ue-Category field indicating the first UE category and a ue-Category-v10xy field indicating the second UE category.

The UE performs normal operations with the settings configured in the RRC Connection Setup process until an RRC Connection Reconfiguration command is received from the eNB.

The UE receives the RRC Connection Reconfiguration message in step 207. Upon receipt of the RRC Connection Reconfiguration message, the UE determines whether the RRC Connection Reconfiguration message includes UE category information or a newly configured Rel-10 function in step 209. The newly configured Rel-10 function can be checked upon one of the following events:

when transmission mode 9 is configured as downlink transmission mode;

when transmission mode 2 is configured as uplink transmission mode;

when carrier aggregation is configured; and when the MIMI capability is higher than Rel-8 category MIMO capability of the UE.

If the RRC Connection Reconfiguration message includes no UE category information or newly configured Rel-10 function (e.g. TM 9 is not configured), the UE performs downlink data communication using $N_{soft}$ corresponding to the first UE category (the earliest release UE category reported most lately or the most lately reported one among categories 1 to 5). In an exemplary embodiment of the present invention, if downlink communication is performed with $N_{soft}$ corresponding to a certain category, this means that $N_{soft}$ is used to calculate $N_{IR}$ for use in rate matching and HARQ IR operation. The UE continues operation at step 211 until an RRC Connection Reconfiguration message is received.

In contrast, if it is determined in step 209 that the RRC Connection Reconfiguration message includes the newly configured Rel-10 function or information indicating the use of the second UE category, the UE performs downlink data communication with $N_{soft}$ corresponding to the value indicated in the second UE category in step 213.

The UE continues operations at step 213 until the first UE category is indicated or the Rel-10 function is disabled by means of the RRC Connection Reconfiguration message.

Figure 3:
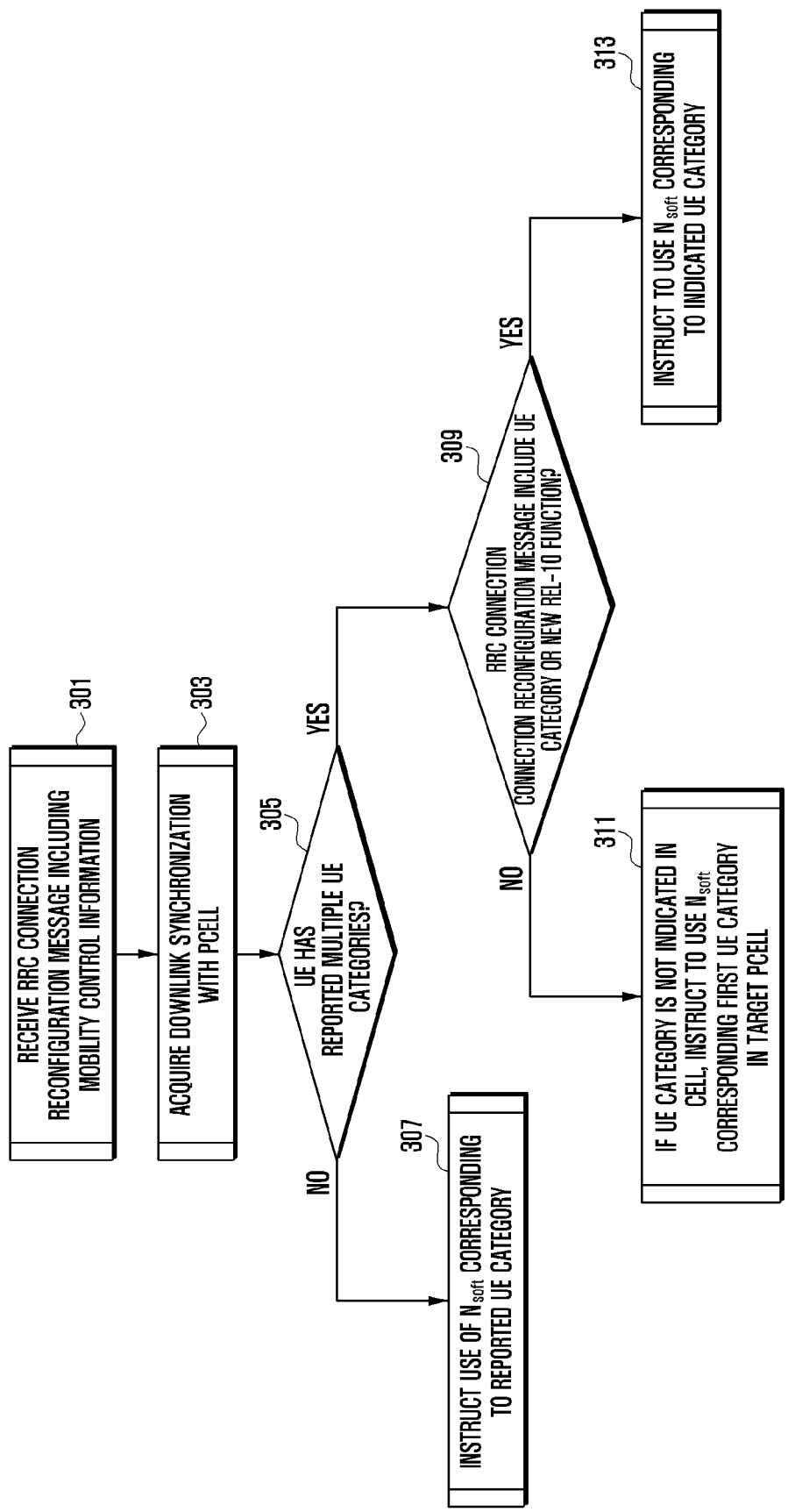
FIG. 3 is a flowchart illustrating a handover procedure of a UE in a UE category handling method according to an exemplary embodiment of the present invention.

FIG. 3 is a flowchart illustrating a handover procedure of a UE in a UE category handling method according to an exemplary embodiment of the present invention.

Referring to FIG. 3, it is assumed that the UE and the network are connected to each other and in data communication.

The UE receives an RRC Connection Reconfiguration message, i.e. handover command message, including mobility control information from the serving cell in step 301. The RRC Connection Reconfiguration message includes the information on the target cell of the UE's handover.

Upon receipt of the RRC Connection Reconfiguration message, the UE releases the connection with the current serving cell and acquires downlink synchronization with the target cell in step 303. If operating in carrier aggregation mode, the UE acquires downlink synchronization on the target Primary Cell (PCell).

After acquiring synchronization, the UE determines whether it has reported multiple UE categories in step 305. If it is determined that the UE has reported only one UE category, the UE performs downlink data communication with $N_{soft}$ corresponding to the reported UE category in the target cell in step 307. That is, the UE's RRC layer instructs the UE's physical layer to determine $N_{soft}$ by applying (or assuming) the UE category reported (or supported) by the UE. If one UE category has been reported, this means that the UE supports the first UE categories, i.e. UE categories 1 to 5 defined in Rel-8 and the UE's RRC layer instructs the UE's physical layer to apply the Rel-8 category (categories 1 to 5).

In contrast, if it is determined at step 305 that the UE has reported multiple UE categories, the UE determines whether the RRC Connection Reconfiguration message includes UE category information or a new Rel-10 function enabled in step 309. The UE also can determine whether the RRC Connection Reconfiguration message is delta-signaled or includes full configuration. The new Rel-10 function enabled can be checked upon one of the following conditions:

when transmission mode 9 is configured as downlink transmission mode;

when transmission mode 2 is configured as uplink transmission mode;

when carrier aggregation is configured; and when MIMI capability higher than Rel-8 category MIMO capability of UE.

If the RRC Connection Reconfiguration message does not include UE category information or new Rel-10 function enabled or if the full configuration is signaled (this means the release version of the target eNB is less than the release version of the source eNB), the UE performs downlink data communication in the target cell (or target PCell) using $N_{soft}$ corresponding to the first UE category (or the earliest release UE category reported most lately or the most lately reported one among categories 1 to 5) in step 311. If the UE's RRC layer has notified the UE's PHY layer of the UE category to apply for determination of $N_{soft}$ in the current cell (the serving cell before handover), this means that the UE's RRC has instructed the UE's PHY to apply Rel-8 category (categories 1 to 5) supported by the UE. If the UE category has not been informed, there is no need of separate operation since the UE's PHY is already applying Rel-8 category supported by the UE.

In contrast, if it is determined in step 309 that the RRC Connection Reconfiguration message includes the information on the UE category to be used or new Rel-10 function enabled, the UE performs downlink communication in the target cell (or target PCell) using $N_{soft}$ corresponding to the indicated UE category in step 313. That is, the UE's RRC notifies (or assigns or informs) the UE's PHY of the indicated UE category, and the UE's PHY determines $N_{soft}$ by applying the indicated (or informed) UE category. The UE continues the operation at step 313 until new UE category information is in a new RRC Connection Reconfiguration message.

Figure 4:
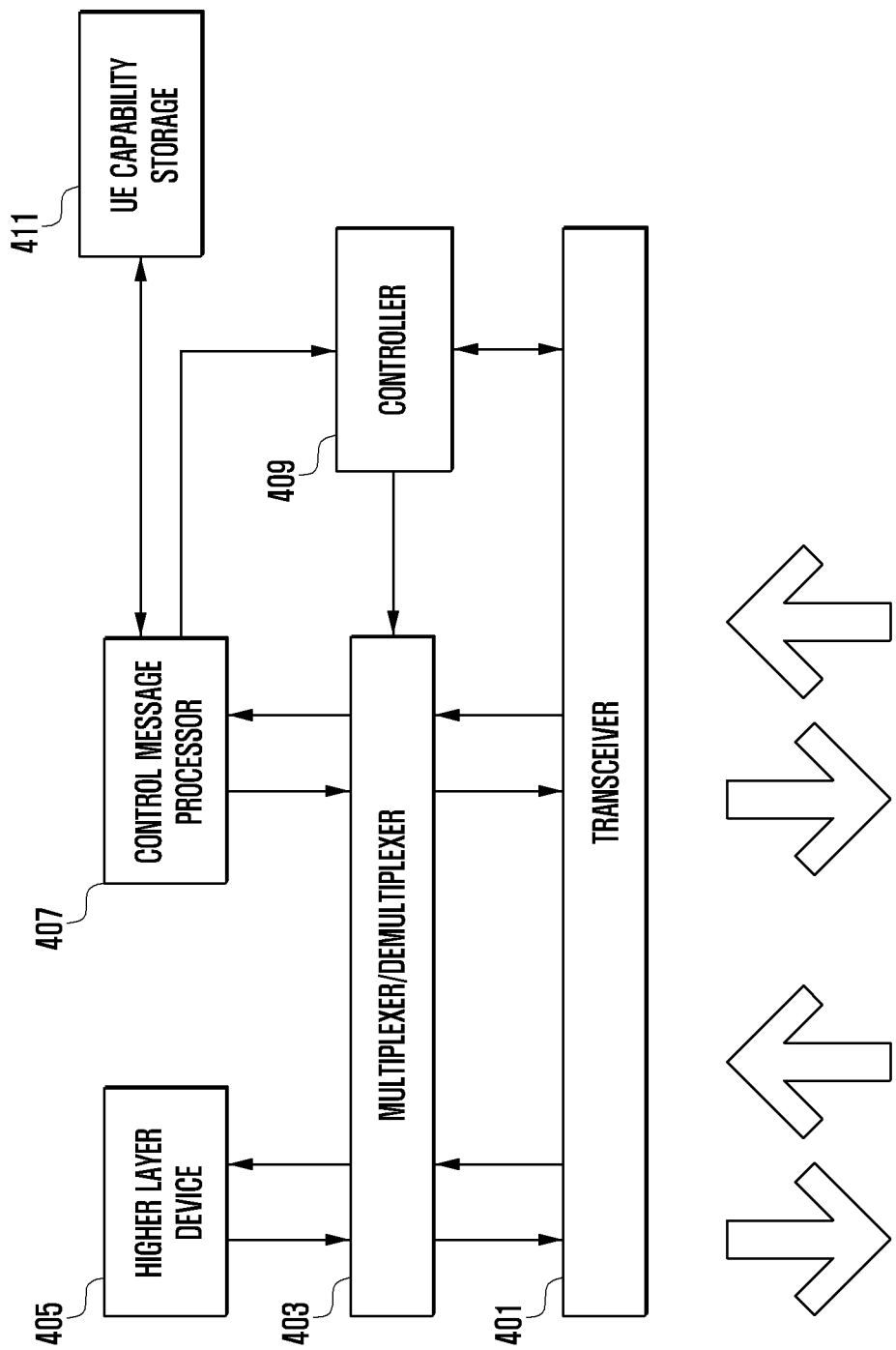
FIG. 4 is a block diagram illustrating a configuration of a UE according to an exemplary embodiment of the present invention.

FIG. 4 is a block diagram illustrating a configuration of a UE according to an exemplary embodiment of the present invention.

Referring to FIG. 4, the UE transmits and receives data generated at higher layer device 405 and control messages generated at the control message processor 407.

The transmission data is multiplexed by the multiplexer/demultiplexer 403 and then transmitted by means of the transceiver 401 under the control of the controller 409. The physical signal is received by means of the transceiver 401, demultimplexed by the multiplexer/demultiplexer 403, and then transferred to the higher layer device 405 and/or the control message processor 407 under the control of the controller 409.

According to an exemplary embodiment of the present invention, the UE acquires information on the UE capability from a UE capability storage 411 and sends one or more UE capabilities to the control message processor 407 to report the UE capability to the eNB. Afterward, if an RRC Connection Reconfiguration message is received from the eNB, the control message processor 407 determines whether the RRC Connection Reconfiguration message includes the information on the UE category to be used or a new Rel-10 function enabled and then, if it is determined to apply a category belonging to the second UE category group, notifies the controller 409 of updated $N_{soft}$ to control the communication with parameters of the second UE category afterward.

If a handover command message is received, the control message processor 407 determines whether the handover command message includes the information on the UE category to be used or a new Rel-10 function enabled and, if so, controls the UE to perform communication with the target eNB by applying the parameters for the indicated second UE category.

Although the description is directed to the UE configured with a plurality of function blocks responsible for different functions, the present invention is not limited thereto. For example, the UE can be configured with a transceiver 401 for communicating signals with the network and the controller 409.

In this case, when the UE attaches to and/or registers with the network, the controller 409 can control to transmit the UE capability including multiple UE categories to the network. The controller 409 receives the RRC Connection Reconfiguration message including the information on the UE category to be used by the UE according to the type of the service eNB. The controller 409 controls communication with the network based on the UE category information received from the network.

When transmitting the UE capability report message, the controller 409 sets the ue-Category field with the information on the first UE category and the ue-Category-v10xy field with the second UE category.

In case that the serving eNB supports the second version network, i.e. the serving eNB is a Rel-10 eNB, the control unit receives the RRC Connection Reconfiguration message including downlink transmission mode set to transmission mode 9. The transmission mode 9 is characterized by supporting up to 8 layers transmission, the pre-coded demodulation reference signal transmission, and use of new downlink control information format.

According to an exemplary embodiment of the present invention, the controller 409 can control the communication with the network according to the first UE category until the information on the UE category is received from the network.

In the handover, the controller 409 receives a handover command message including information on the UE category to be used in the target cell from the target cell. In case that the target cell supports the second version network, the handover command message can include information on the UE category to be used in the target cell or the new function enabled for use in the second version network.

As described above, an exemplary UE category handling method of the present invention is capable of facilitating communication between a UE and networks operating on different technology releases while maintaining compatibility without malfunction, especially when a late release UE attempts to attach to a legacy network or a new network.

Also, an exemplary UE category handling method of the present invention allows the UE to report UE category information adaptive of the release version of the network, thereby avoiding malfunction in communication with optimized data rate, resulting in improvement of UE and network performances.

Certain aspects of the present invention can also be embodied as computer readable code on a computer readable recording medium. A computer readable recording medium is any data storage device that can store data which can be thereafter read by a computer system. Examples of the computer readable recording medium include Read-Only Memory (ROM), Random-Access Memory (RAM), CD-ROMs, magnetic tapes, floppy disks, and optical data storage devices. The computer readable recording medium can also be distributed over network coupled computer systems so that the computer readable code is stored and executed in a distributed fashion. Also, functional programs, code, and code segments for accomplishing the present invention can be easily construed by programmers skilled in the art to which the present invention pertains.

At this point it should be noted that the exemplary embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the exemplary embodiments of the present invention as described above. Alternatively, one or more processors operating in accordance with stored instructions may implement the functions associated with the exemplary embodiments of the present invention as described above. If such is the case, it is within the scope of the present disclosure that such instructions may be stored on one or more processor readable mediums. Examples of the processor readable mediums include Read-Only Memory (ROM), Random-Access Memory (RAM), CD-ROMs, magnetic tapes, floppy disks, and optical data storage devices. The processor readable mediums can also be distributed over network coupled computer systems so that the instructions are stored and executed in a distributed fashion. Also, functional computer programs, instructions, and instruction segments for accomplishing the present invention can be easily construed by programmers skilled in the art to which the present invention pertains.

While the invention has been shown and described with reference to certain exemplary embodiments thereof, it will be understood by those skilled in the art that various changes in form and details may be made therein without departing from the spirit and scope of the present invention as defined by the appended claims and their equivalents.

What is claimed is:

1. A transmission method of a terminal in a mobile communication system, the transmission method comprising:
    transmitting a plurality of terminal categories, each of which corresponds to one of at least two category groups;
    receiving transmission mode information corresponding to one of the plurality of terminal categories;
    if the transmission mode information includes a first transmission mode, identifying a total number of soft channel bits as a first value based on the first transmission mode, else identifying the total number of soft channel bits as a second value; and
    transmitting data based on the transmission mode information,
    wherein the first value is greater than the second value,
    wherein the plurality of terminal categories are transmitted through a terminal capability message, and
    wherein the terminal capability message comprises a first terminal category field indicating a first terminal category and a second terminal category field indicating a second terminal category, each of the first and second terminal categories being selected from one of the at least two category groups.

2. The method of claim 1, wherein the transmission mode information includes transmission mode 9 as the first transmission mode if a serving base station of the terminal is an enhanced version network.

3. The method of claim 2, wherein the transmission mode 9 supports up to 8 layers for transmission, transmits a precoded modulation reference signal, and uses a new downlink control information format.

4. The method of claim 1, wherein the transmission mode information is received through a radio resource control (RRC) connection reconfiguration message.

5. The method of claim 1, wherein a soft buffer size NIR corresponding to the total number of soft channel bits is obtained using an equation:

$$N_{IR} = \left\lfloor \frac{N_{soft}}{K_{MIMO} \cdot \min(M_{DL\_HARQ}, M_{limit})} \right\rfloor, N_{cb} = \min\left(\left\lfloor \frac{N_{IR}}{C} \right\rfloor, K_w\right),$$

wherein $N_{soft}$ is the total number of soft channel bits, $N_{cb}$ is code block soft buffer size, $K_{MIMO}$ has a value of 2 or 1 depending on the transmission mode information, $\min(M_{DL\_HARQ}, M_{limit})$ has a value of 8, C denotes a number of code blocks, and $K_W$ denotes the length of a circular buffer.

6. The method of claim 1, further comprising receiving, when a handover is triggered, a handover command message from a target cell including information on the terminal category to be used in the target cell.

7. The method of claim 1, wherein the transmission mode information corresponds to a type of serving base station of the terminal.

8. A terminal for transmitting data to a network in a mobile communication system, the terminal comprising:
    a transceiver configured to communicate signals with the network; and
    a controller configured to control transmission of a plurality of terminal categories, each of which corresponds to one of at least two category groups, control reception of transmission mode information corresponding to one of the plurality of terminal categories, if the transmission information is a first transmission mode, identify a total number of soft channel bits as a first value based on the first transmission mode, else identify the total number of soft channel bits as a second value, and control transmission of data based on the transmission mode information,
    wherein the first value is greater than the second value,
    wherein the plurality of terminal categories are transmitted through a terminal capability message, and
    wherein the terminal capability message comprises a first terminal category field indicating a first terminal category and a second terminal category field indicating a second terminal category, each of the first and second terminal categories being selected from one of the at least two category groups.

9. The terminal of claim 8, wherein the transmission mode information includes transmission mode 9 as the first transmission mode if a serving base station of the terminal is an enhanced version network.

10. The terminal of claim 9, wherein the transmission mode 9 supports up to 8 layers for transmission, transmits a precoded modulation reference signal, and uses a new downlink control information format.

11. The terminal of claim 8, wherein the transmission mode information is received through a radio resource control (RRC), connection reconfiguration message.

12. The terminal of claim 8, wherein a soft buffer size NIR corresponding to the total number of soft channel bits is obtained using an equation:

$$N_{IR} = \left\lfloor \frac{N_{soft}}{K_{MIMO} \cdot \min(M_{DL\_HARQ}, M_{limit})} \right\rfloor, N_{cb} = \min\left(\left\lfloor \frac{N_{IR}}{C} \right\rfloor, K_w\right),$$

wherein $N_{soft}$ is the total number of soft channel bits, $N_{cb}$ is code block soft buffer size, $K_{MIMO}$ has a value of 2 or 1 depending on the transmission mode information, min $(M_{DL\_HARQ}, M_{limit})$ has a value of 8, C denotes a number of code blocks, and $K_W$ denotes the length of a circular buffer.

13. The terminal of claim 8, wherein the controller controls, if a handover is triggered, reception of a handover command message from a target cell including information on the terminal category to be used in the target cell.

14. The terminal of claim 8, wherein the transmission mode information corresponds to a type of serving base station of the terminal.

* * * * *